(12) United States Patent
Gordon et al.

(10) Patent No.: US 9,599,133 B2
(45) Date of Patent: Mar. 21, 2017

(54) JEWELRY CLASP

(71) Applicant: Medi-Clasp, LLC, Long Beach, CA (US)

(72) Inventors: Cheryl Yvonne Gordon, Long Beach, CA (US); Edgar Jamkochian, Los Angeles, CA (US)

(73) Assignee: Mediclasp, LLC, Long Beach, CA (US)

( * ) Notice: Subject to any disclaimer, the term of this patent is extended or adjusted under 35 U.S.C. 154(b) by 0 days.

(21) Appl. No.: 14/568,352

(22) Filed: Dec. 12, 2014

(65) Prior Publication Data

US 2015/0337880 A1    Nov. 26, 2015

Related U.S. Application Data

(60) Provisional application No. 61/963,690, filed on Dec. 12, 2013.

(51) Int. Cl.
*A44C 11/02* (2006.01)
*F16B 2/02* (2006.01)
*A44C 5/20* (2006.01)

(52) U.S. Cl.
CPC .............. *F16B 2/02* (2013.01); *A44C 5/2085* (2013.01); *Y10T 24/45257* (2015.01)

(58) Field of Classification Search
CPC ....... F16B 2/02; A44C 5/2085; A44C 5/2023; A44C 5/2028; A44C 5/2057; A44C 5/2061; A44B 11/2596; A44B 11/2515; Y10T 24/45257; Y10T 24/45723; Y10T 24/45534; Y10T 24/45084
See application file for complete search history.

(56) References Cited

U.S. PATENT DOCUMENTS 5,671,516 A * 9/1997 Sartori ............... A44B 11/2515
24/579.11

* cited by examiner

*Primary Examiner* — Jack W Lavinder

(57) ABSTRACT

A jewelry clasp comprises a male member having prong. A distal groove of the prong is configured to glide into a bore slot of a female member. A barrier wall within the bore slot is configured to stop the prong. One or more safety pegs are configured to retract a spring held in place by a housing beam peg and support beam peg as the prong glides into the bore slot.

4 Claims, 2 Drawing Sheets

JEWELRY CLASP

RELATED APPLICATION INFORMATION

This Application claims priority from U.S. Provisional Application Ser. No. 61/963,690, entitled "Medi-Clasp", and filed on Dec. 12, 2013.

FIELD OF THE INVENTION

This invention generally relates to a jewelry clasp. More specifically, the present invention relates to a jewelry clasp having a male member prong with an attached facing wall with a distal groove of the prong that glides into the female member bore slot with a barrier wall to stop the prong.

SUMMARY OF THE INVENTION

In order to solve the problems and shortcomings of the prior art, according to one preferred embodiment, a jewelry clasp, comprises: a male member having prong; distal groove of the prong configured to glide into a bore slot of a female member a barrier wall within the bore slot configured to stop the prong; and one or more safety pegs configured to retracted a spring held in place by a housing beam peg and support beam peg as the prong glides into the bore slot.

DETAILED DESCRIPTION OF THE PREFERRED EMBODIMENTS

For the purpose of illustrating the invention, there is shown in the accompanying drawings several embodiments of the invention. However, it should be understood by those of ordinary skill in the art that the invention is not limited to the precise arrangements and instrumentalities shown therein and described below.

Figure 1:
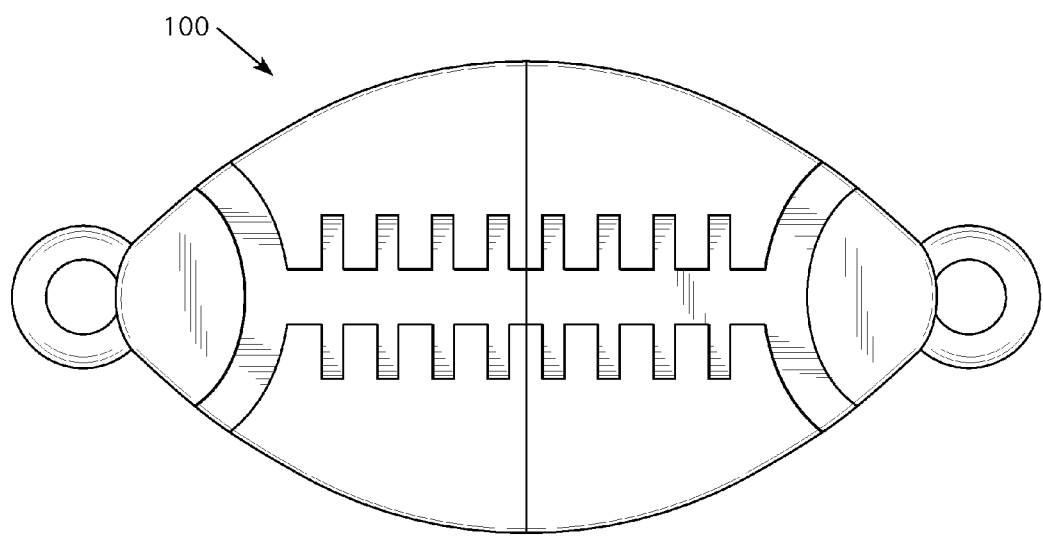
FIG. 1 is a top elevational view of the jewelry clasp according to one embodiment.
Figure 2:
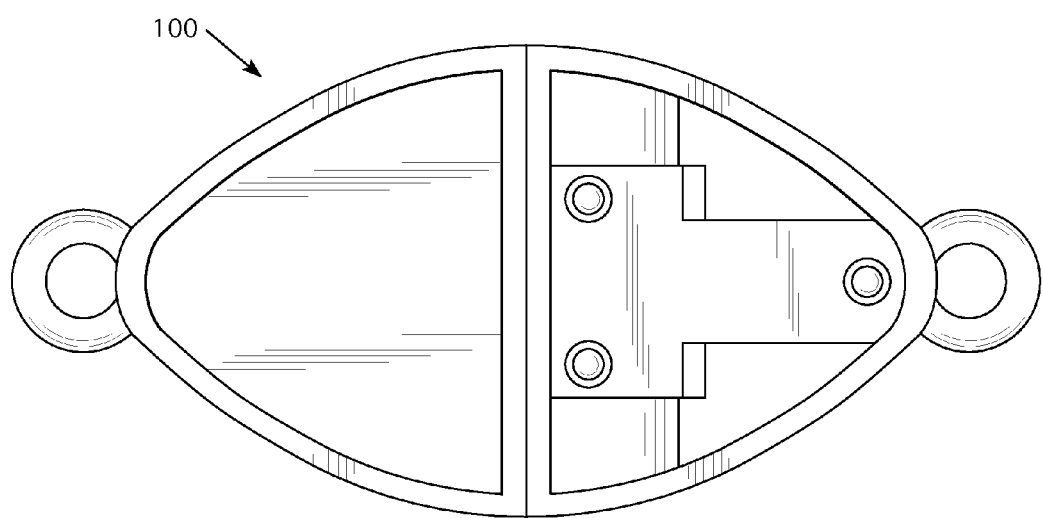
FIG. 2 is a bottom elevational view of the jewelry clasp according to the embodiment of FIG. 1.
Figure 3:
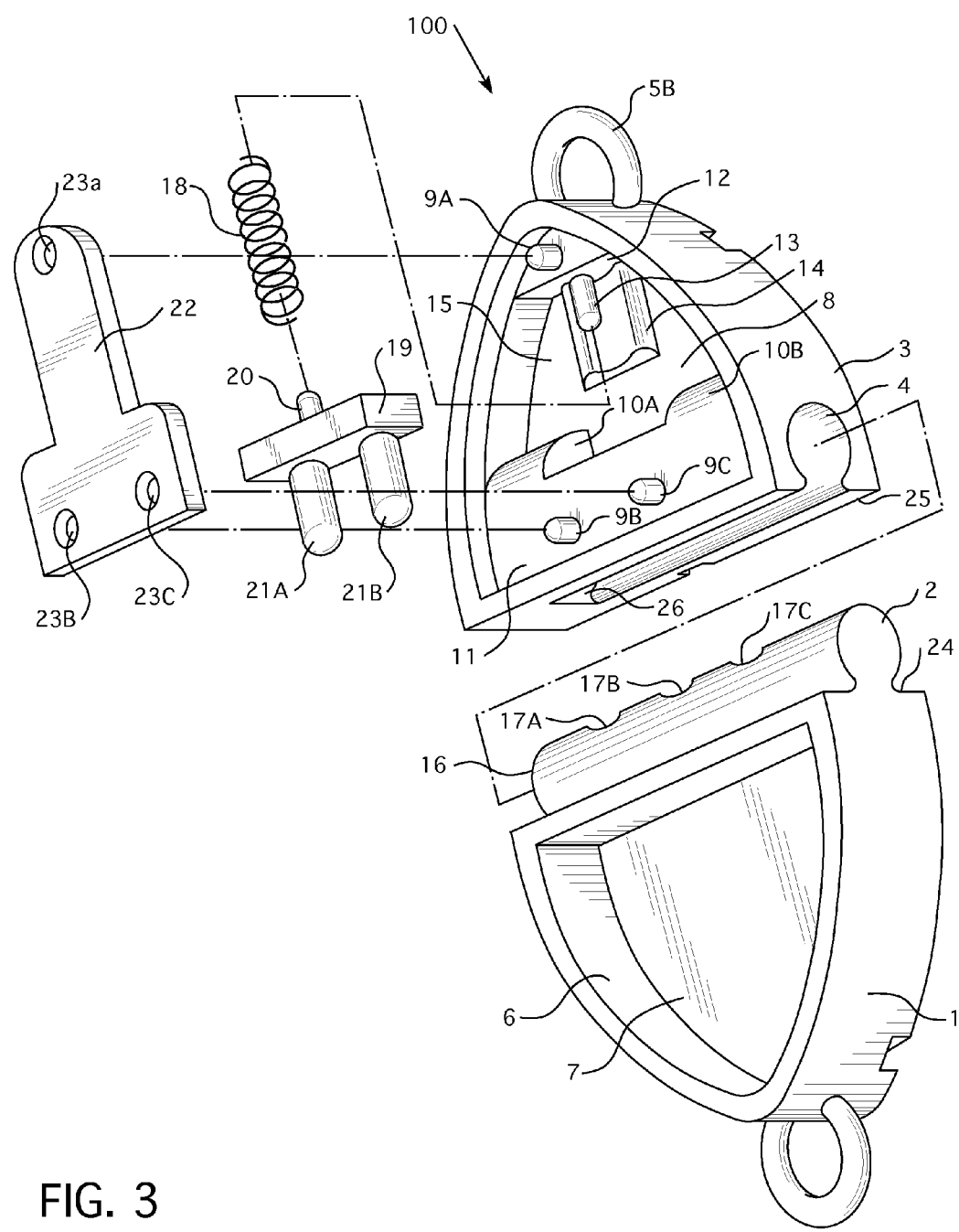
FIG. 3 is a diagrammatic bottom-left perspective exploded view of the jewelry clasp according to the embodiments of FIGS. 1 and 2.

The jewelry clasp is disclosed in accordance with preferred embodiments of the present invention and is illustrated in FIGS. 1-3 wherein like reference numerals are used throughout to designate like elements.

With reference to FIG. 1, a top elevational view of a jewelry clasp 100 according to one embodiment is shown.

With reference to FIG. 2, a bottom elevational view of the jewelry clasp 100 according to the embodiment of FIG. 1 is shown.

With reference to FIG. 3, an exploded bottom-left perspective view of the jewelry clasp 100 according to one embodiment is shown. A male member (1) prong (2), having a base (7) and sidewalls (6), may be ¾ the length of its attached facing wall (24). A primary sliding groove (16) of the prong (2) may glide into a bore slot (4) of a female member (3), the female member (3) having a base (8), a support beam (12) and sidewalls (15). In one embodiment, the bore slot may be ¾ the length of its attached facing wall (25) with a barrier wall (26) to stop the prong (2). As the prong (2) glides along the tracking grooves (17A), (17B) and (17C) it may cause the housing beam (19) safety pegs (21A and 21B) to retract the spring (18) that may be held in place by housing beam peg (20) and the support beam peg (13). The cross beam (11) has two blinded adjacent openings that may be in an alignment with the housing beam safety pegs (21A and 21B).

In one embodiment, once the prong (2) is inserted into the bore slot (4) completely, spring (18) releases and the housing beam (19) rests between the crossbeam (11) alignment notches (10A and 10B) to maintain smooth traction and retraction of the spring (18). The spring cradle (14) escorts and prevents buckling of the spring (18). The cover plate (22) connecting holes (23A), (23B) and (23C) fits over the female member (3) stationary pegs (9A, 9B and 9C) to conceal the inner components. The housing beam (19) safety pegs (21A and 21B) lock into place with the tracking grooves (17B and 17C) on the prong (2). The two-part clasp male member (1) and female member (3) mechanism may be interlocked in place for a lateral engagement. While groove (16) may be the primary gliding groove, groove (17A) may be a secondary gliding groove to steer the prong through the bore and tracking grooves (17B and 17C) to lock into the safety pegs (21A and 21B).

The clasp 100 is thus configured for a chain or cord to be attached to the loops (5A and 5B) to create a necklace, bracelet or anklet The various embodiments described above are provided by way of illustration only and should not be construed to limit the invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed is:

1. A jewelry clasp, comprising:
    a male member having prong;
    a distal groove on a distal side of the prong configured to glide into a bore slot of a female member
    a barrier wall within the bore slot configured to stop the prong; and
    one or more safety pegs fit through a cross beam configured to be retracted upon actuation of a spring held in place by a housing beam peg on a housing beam within a female member and a support beam peg on a support beam attached to the inside of the female member as the prong glides into the bore slot.

2. The jewelry clasp of claim 1, further comprising a housing beam that rests between crossbeam alignment notches to maintain smooth traction and retraction of the spring.

3. The jewelry clasp of claim 1, further comprising a cover plate that fits over the female member.

4. The jewelry clasp of claim 1, further comprising a reception portion of the prong for each safety peg configured to receive each safety pegs configured to hold the prong in place.

* * * * *